(No Model.) 2 Sheets—Sheet 1.

L. BOYÉR & J. B. HENRY.
ODORLESS EXCAVATING APPARATUS.

No. 277,209. Patented May 8, 1883.

WITNESSES:
D. W. Hamilton Johnson
Saml. C. Thomas

INVENTORS.
John B. Henry
Léon Boyér
By H. N. Jenkins
Attorney (No Model.)
L. BOYÉR & J. B. HENRY.
2 Sheets—Sheet 2.
ODORLESS EXCAVATING APPARATUS.
No. 277,209.
Patented May 8, 1883.
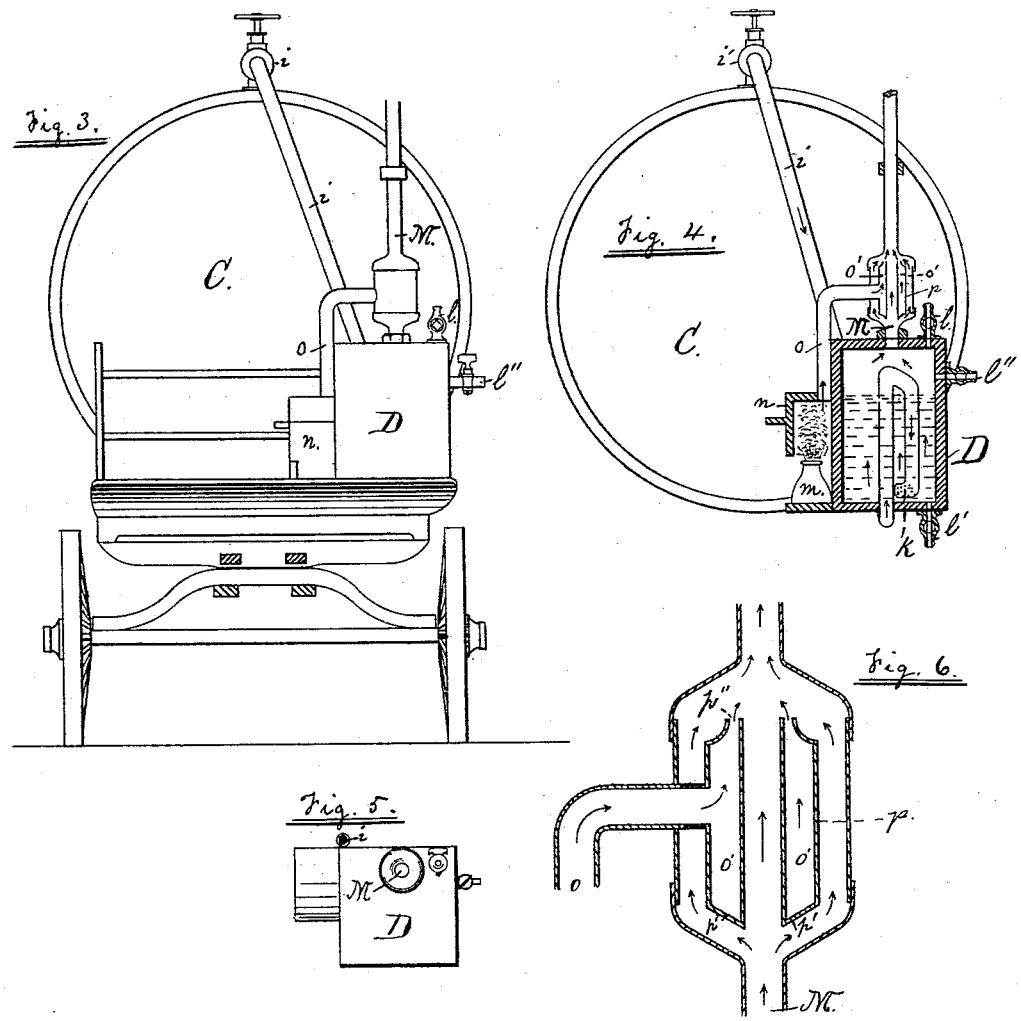

UNITED STATES PATENT OFFICE.

LÉON BOYÉR AND JOHN B. HENRY, OF NEW ORLEANS, LOUISIANA.

ODORLESS EXCAVATING APPARATUS.

SPECIFICATION forming part of Letters Patent No. 277,209, dated May 8, 1883.

Application filed September 25, 1882. (No model.)

*To all whom it may concern:*

Be it known that we, LÉON BOYÉR and JOHN B. HENRY, residents of the city of New Orleans, parish of Orleans, and State of Louisiana, have invented a certain new and useful Improvement in Odorless Excavating Apparatus; and we do hereby declare the following to be a full, clear, and correct description of the same, reference being had to the annexed drawings, making a part of this specification.

This invention relates to a process and apparatus for cleaning privy-vaults and deodorizing the vapors or gases as they are permitted to escape from the receiving-tank of the said apparatus.

Figure 1:
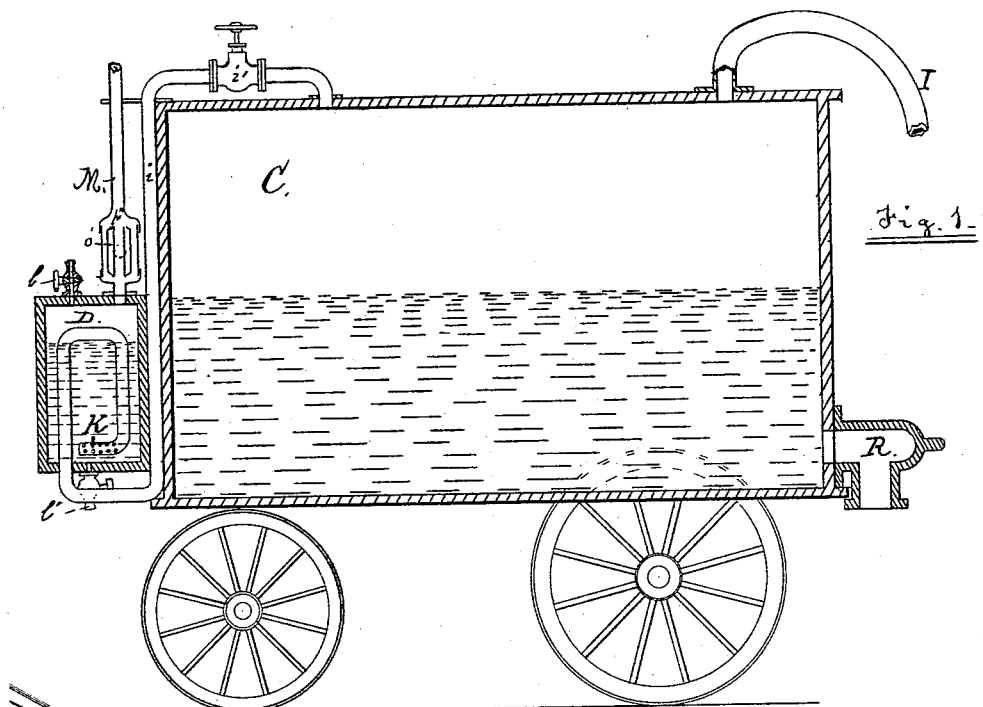
Figure 2:
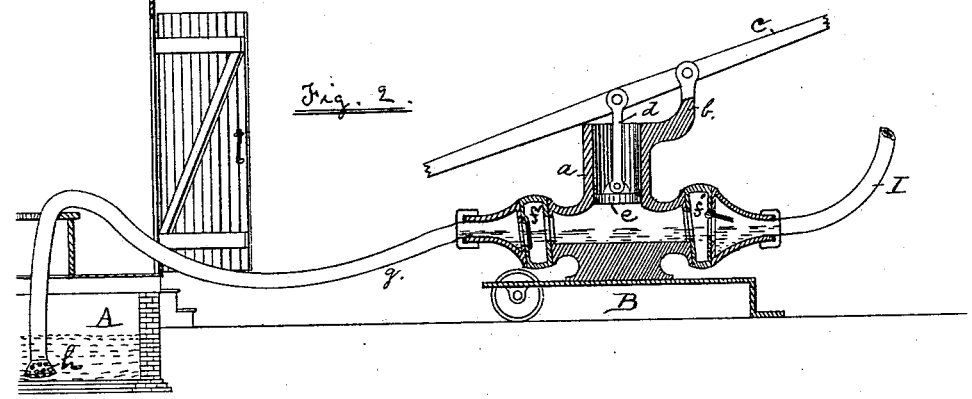

On the drawings, Figure 1 represents a longitudinal sectional view of our receiving-tank with its deodorizing-chamber and connections. Fig. 2 is a section of a privy-vault with emptying-pump provided with suitable hose-connections. Fig. 3 is a front elevation of the receiving-tank and deodorizing-chamber. Fig. 4 is a front view of the tank, with vertical cross-section of its deodorizing-chamber. Fig. 5 is a top view of the deodorizing-chamber; and Fig. 6, an enlarged sectional view of a pipe-chamber for accelerating the escape of the gases, as well as for more thoroughly deodorizing the same.

On the drawings, the letter A designates the privy-vault; B, the pump for emptying the same; C, the tank into which the feculent matter is received, and D the deodorizing-chamber of the tank.

The pump is of the lift-and-force kind, and may subsequently become the subject of a separate application for Letters Patent. It is provided with a vertical cylinder, $a$, having a side arm, $b$, to which is pivoted an operating-lever, $c$, having a link-connection, $d$, with the piston $e$, as shown. The horizontal portion of the pump, situated below the aforesaid vertical cylinder, is provided at each side of said cylinder with removable valve-chambers, $ff'$. The former, near the suction end, has its valve to open inwardly. To this end of the pump is connected, when ready for operation, a suction-hose, $g$, the outer extremity of which is provided with a strainer, $h$, for insertion into the vault, as shown. The valve-seat $f'$, located on the discharge side of the pump, has its valve to open outward. To this end of the pump is attached a hose, I, through which the feculent matter is forced into the tank C. The capacity of the tank is sufficient to contain all the accumulations of an ordinary privy-vault, and for facility in transportation it is mounted on wheels in a manner similar to that of an ordinary wagon-body.

The deodorizing-chamber D is situated at one end of the tank, preferably the forward end. To it the gases are conveyed from the upper part of the tank by a pipe, $i$, having a check-valve, $i'$. This pipe enters at the bottom of the chamber, within which it is coiled or bent, and that portion which is nearest the bottom of the chamber is perforated, as shown at $k$, to permit of the escape of the gases in small jets or streams. This chamber is partially filled with a solution of copperas and water, through which the gases ascend, and thus become deodorized. The chamber D is provided at its top with a plugged tube, $l$, through which the aforesaid solution is poured. At the bottom of the chamber is a faucet, $l'$, for withdrawing the impoverished liquid, and at one side is a "try-cock" or "gage," $l''$, for ascertaining when a sufficient quantity of solution has been poured therein.

To the top of the chamber D is fitted an escape-pipe, M, having an enlarged portion formed therein, as clearly shown in Fig. 6. Within this portion the gases are more thoroughly deodorized and their escape accelerated by being brought in contact with the fumes of burning rosin, the latter introduced into the enlarged portion of the pipe from a furnace, $m$, located at one side of the chamber D. The said furnace is partially inclosed, as shown at $n$, so that the fumes may be conveyed from it by a pipe, $o$, to an annular space, $o'$, formed between the two shells of a receiver, $p$, the latter having a closed bottom, $p'$, and a contracted top opening, as shown at $p''$, through which the escaping fumes mingle with the outward-flowing gases, accelerating the discharge of the latter, as well as still further deodorizing the same.

The tank C is provided at its rear, or at any other portion, with a discharge-tube, R, having a gate or valve of any suitable kind.

Having described our invention, what we claim as new, and desire to secure by Letters Patent, is—

1. In combination, with the deodorizing-chamber D, having an inlet-pipe, $i$, the escape-pipe M, within the enlarged portion of which is a double shell-receiver, p, provided with top opening, p'', and a receiving-pipe, o, substantially as described, and for the purpose set forth.

2. The herein-described privy cleaning and deodorizing apparatus, consisting in the combination of a pump, B, having hose g and I, the tank C, pipe i, deodorizing-chamber D, and escape-pipe M, the latter provided with an enlarged portion for the reception of a receiver, p, having an opening at its top for the escape of the fumes which are conveyed to the said receiver from a furnace, substantially as set forth.

In testimony whereof we affix our signatures in presence of two witnesses.

LÉON BOYÉR.
JOHN BAPTISTE HENRY.

Witnesses:
J. N. MÜLLER,
P. J. FINNEY.